United States Patent [19]

Waldschmidt et al.

[11] Patent Number: 5,563,918

[45] Date of Patent: Oct. 8, 1996

[54] METHOD OF SELECTING OPTIMUM FREQUENCY IN SKYWAVE COMMUNICATION APPARATUS

[75] Inventors: Richard J. Waldschmidt, Cedar Rapids, Iowa; Daniel O. Weddle, Plano; C. David Young, Richardson, both of Tex.

[73] Assignee: Rockwell International, Seal Beach, Calif.

[21] Appl. No.: 169,877

[22] Filed: Dec. 17, 1993

[51] Int. Cl.$^6$ .................................................. H03D 1/00

[52] U.S. Cl. ........................................ 375/347; 375/267

[58] Field of Search ................................. 375/260, 267, 375/295, 347, 340, 224; 455/62, 63, 135; 371/5.5

[56] References Cited

U.S. PATENT DOCUMENTS

| | | | |
|---|---|---|---|
| 4,555,806 | 11/1985 | Lange et al. | 455/62 |
| 4,780,885 | 10/1988 | Paul et al. | 455/62 |
| 4,937,822 | 6/1990 | Weddle et al. | 370/124 |
| 5,031,193 | 7/1991 | Atkinson et al. | 375/347 |
| 5,048,054 | 10/1991 | Eyuboglu et al. | 455/62 |
| 5,093,927 | 3/1992 | Shanley | 455/62 |
| 5,159,704 | 10/1992 | Pirolli et al. | 455/62 |
| 5,191,598 | 3/0293 | Bäckström et al. | 375/347 |
| 5,204,855 | 4/1993 | Bebee et al. | 370/50 |
| 5,204,856 | 4/1993 | Bebee et al. | 370/50 |
| 5,230,076 | 7/1993 | Wilkinson | 455/62 |
| 5,319,677 | 6/1994 | Kim | 375/347 |
| 5,323,421 | 6/1994 | LaRosa et al. | 375/347 |
| 5,355,522 | 10/1994 | Demange | 455/62 |
| 5,359,595 | 10/1994 | Weddle et al. | 455/62 |
| 5,402,451 | 3/1995 | Kaewell, Jr. et al. | 375/347 |

*Primary Examiner*—Edward L. Coles, Sr.
*Assistant Examiner*—Thomas L. Stoll
*Attorney, Agent, or Firm*—Kyle Eppele; M. Lee Murrah; George A. Montanye

[57] ABSTRACT

In a skywave communication setting, a number of independent measurement techniques can be employed simultaneously and their results combined to yield a metric representative of the channel quality during a particular reception. This sample can then be combined with previous samples taken using the same frequency (or same frequency hop set in a frequency hopping system) to serve as a basis for selecting the best operating frequencies.

1 Claim, 4 Drawing Sheets

METHOD OF SELECTING OPTIMUM FREQUENCY IN SKYWAVE COMMUNICATION APPARATUS

BACKGROUND OF THE INVENTION

The present invention is concerned generally with electronics and more specifically with communication systems. Even more specifically, the invention is considered with a multinode communication system using information packets to pass information from one node to a remote node through a series of intermediate transmissions between the given node and at least one of its predefined neighbors.

The present invention relates to skywave communication systems. By skywave, we mean that communication which is supported by ionized regions above the earth. Such communication is characteristic of high frequency (HF), and may also occur at even higher frequencies. One such higher frequency band is typically designated as very high frequency (VHF).

The frequencies supported by the medium, vary with time. General tendencies over long periods (daily, yearly, and solar cycle periods) are known, but short term variations, over a few minutes or a few hours occur in an apparently random fashion.

Adaptive TDMA (time division multiple access) communication systems have been previously designed which dynamically maintain potentially different frequencies between nodes of the communication system using a process of communicating the quality of received signals between the nodes and storing this information so that an optimum frequency band can be selected, whereby, whenever signal quality deteriorates, an alternate frequency can be selected to provide continued communications. An example of such a system is described in U.S. Pat. No. 4,937,822, dated Jun. 26, 1990, and incorporated herein by reference.

The system outlined in the referenced patent utilized a connectivity phase which could only start a connectivity process at predefined time intervals throughout the day. The connectivity process required checking each of a number of prospective frequencies before deciding which signal would be appropriate to use in initial communications. Thus, even under the best propagation conditions, there would be times when a start-up would be attempted immediately after the occurrence of a predefined start-time interval and would necessitate a lengthy delay interval while all frequencies were checked and subsequent communication frequency(ies) were selected.

The long start-up requirement described in the above referenced U.S. Patent was addressed in U.S. Pat. No. 5,204,855, dated Apr. 20, 1993, and U.S. Pat. No. 5,204,856, dated Apr. 20, 1993, both incorporated herein by reference. With knowledge that each communication node operated from a precise clock and utilized a common connectivity algorithm, such that each node knows exactly what frequency would be attempted by a given neighbor node if that neighbor node were to be transmitting at that time. Thus, each operating node continuously checks a set of frequencies for receipt of signals from other nodes, whether or not the other nodes are operating at that time, to see if start-up is commencing. Since each of the nodes transmits unique preamble signals that identify the source of the transmission, when a given node receives such a transmission identifiable as belonging to a previously assigned neighbor, that node hereforth intransmissions to the node coming on line provides information as to the frequency of the first heard signal as long as the quality of the signal meets minimum standards of quality. As soon as both of the nodes have heard a signal from the other of the stated minimum quality, a connection is declared, and traffic data is transmitted as appropriate. The system continues to search for better frequencies (higher quality) to use in future traffic situations but in the meantime, traffic data can be delivered.

Obviously, the selection of a frequency or frequencies that exhibit superior standards of quality, is of paramount importance. The present invention is directed to the evaluation process of attempted frequencies in order to best determine which frequency will provide superior performance.

SUMMARY OF THE INVENTION

The present invention discloses and claims a method of determining which frequency provides the best quality reception in a skywave communication setting by systematically measuring a plurality of objective signal parameters and subsequently assigning weighted values to each of the objectively measured parameters, thereby yielding a frequency of perceived best performance.

In one embodiment of the above method the average signal-to-noise ratio, the signal-to-noise deviation and an error correction metric are used as objective signal parameters. These parameters are weighted in accordance with factors of age, synchronization, and the presence of cyclic redundancy code errors. Each signal parameter's weighted value are used to determine the best potential communication frequency.

It is an object of the present invention to provide rapid skywave communications of superior frequency.

It is a feature of the present invention that the connectivity method of skywave communication nodes utilizes a plurality of weighted objective signal parameters.

It is an advantage of the present invention that presently utilized skywave communication apparatus can be utilized in a more efficient manner, by use of the methods disclosed in this application.

The foregoing as well as other objects, features and advantages of the present invention will become better understood from the following detailed description taken in conjunction with the various views of the appended drawings.

DETAILED DESCRIPTION OF THE PREFERRED EMBODIMENT

Figure 1:
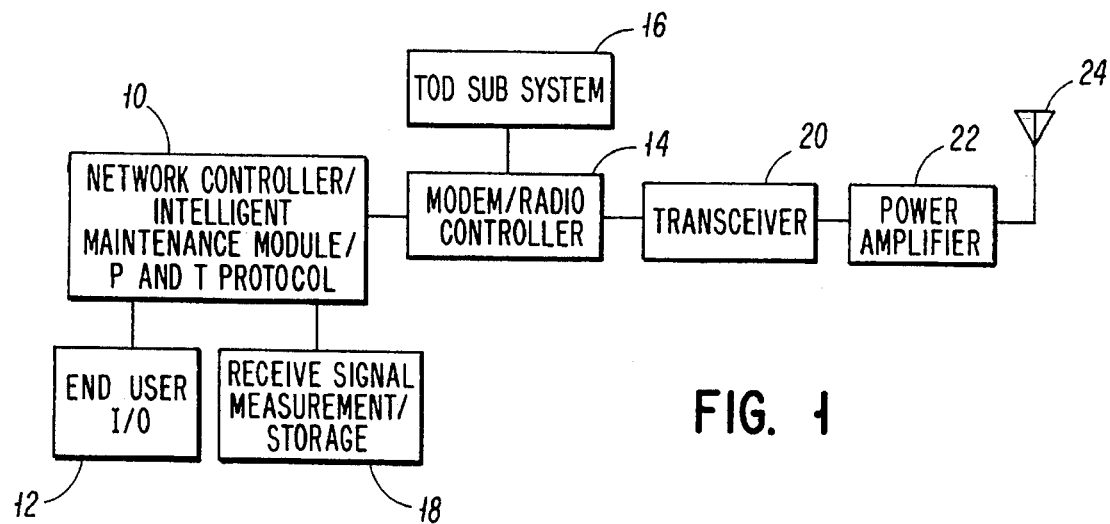
FIG. 1 is a block diagram of the primary components of a single node in a skywave communication network.

Turning now to the Figures, wherein like items are referenced as such throughout. In FIG. 1 a block 10 is shown as a combination network controller which implements the intelligent maintenance module and P & T protocol. It exchanges data with an end user I/O block 12 which could be something as simple as a keyboard and screen from which the operator transmits and receives messages, or any other device for originating and receiving messages. Block 10 is connected to a modem/radio controller 14 which receives time of day information from a block 16 entitled "TOD Subsystem". Block 10 is also connected to a receive signal measurement/storage block 18 which receives signals and provides storage of the measurements made until the stored information is to be used or transmitted to other nodes. Block 14 is connected to a transceiver block 20 which provides signals to a power amplifier 22. Power amplifier 22 is connected to an antenna 24 for transmission of messages or reception of messages from other nodes.

Figure 2:
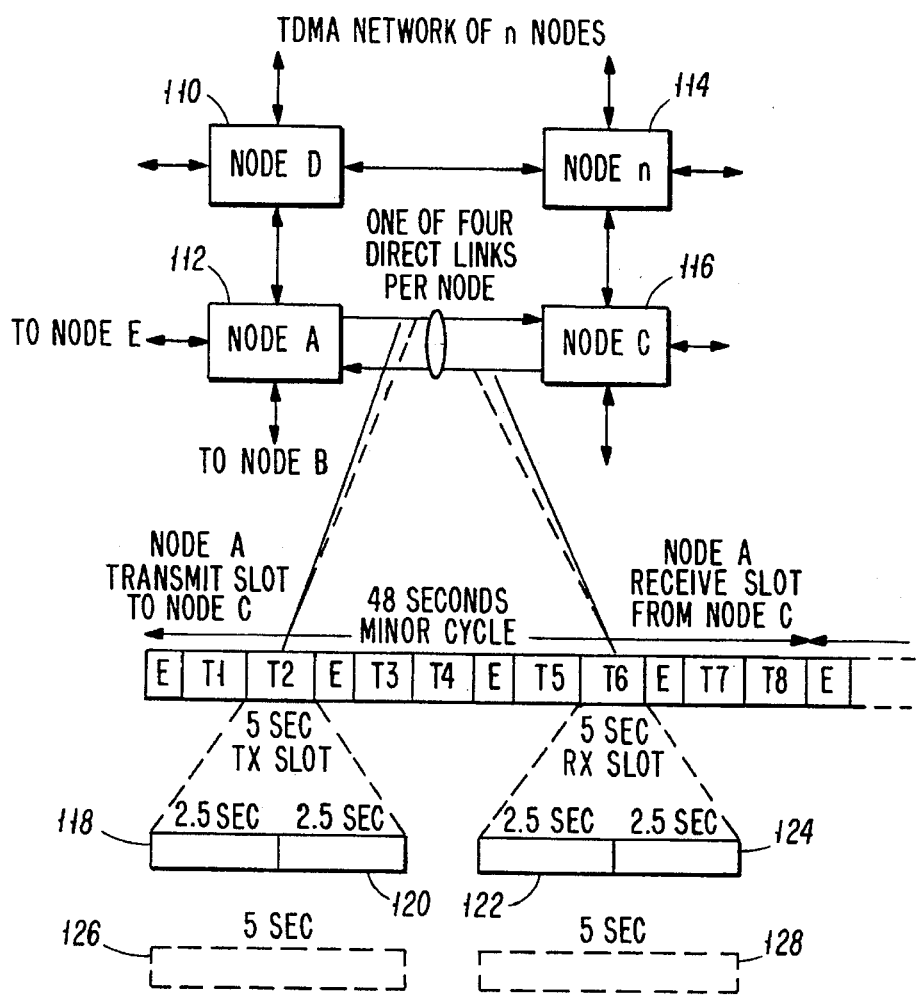
FIG. 2 provides a representation of a data bit stream from a given node to various neighbor nodes, and a further breakdown of the transmit and receive time slots of those communications.

In FIG. 2 a plurality of nodes 110, 112, 114 and 116 are shown comprising a portion of a TDMA network of N nodes. As designed in one embodiment of the concept, each node has the capability of directly contacting each of four other nodes in the network. A minor cycle, as illustrated below the nodes, comprises eight time Slots. As shown, time slot T2 is used to transmit signals from node A to node C and time slot T6 is used for receiving signals from node C. Time slots T3 and T7 might be used to transmit and receive signals to and from node D, and the other time slots for two other nodes B and E not shown. Time slots T2 is broken down into two portions 118 and 120 while time slot T6 is broken down into portions 122 and 124. The five seconds designated as the time for time slot T2 is also typically broken down into 2.5 second time slots. A dash line block 126 is shown representative of the fact that the entire time slot T2 may (on an exceptional basis in the present invention) be used for a single purpose such as delivery of traffic data. As will be mentioned in conjunction with later figures, a given portion requires a preamble for synchronization by the receiving node and thus, the two synchronization packets used in conjunction with 118 and 120 leave much less time available for transmission of data than would the single packet 126. Thus, packet 126 can deliver several times as much usable traffic data as could the single traffic data portion 118. A similar dash line block 128 represents a long packet combination for the receive time slot. As shown, a minor cycle requires 48 seconds since there are four E or emergency time slots which are not defined and not pertinent to the present invention. The entire minor cycle thus requires not only 40 seconds for the assigned time slots T1 through T8, but eight additional seconds for the four emergency time slots. A minor cycle uses up 48 seconds of time.

Figure 3:
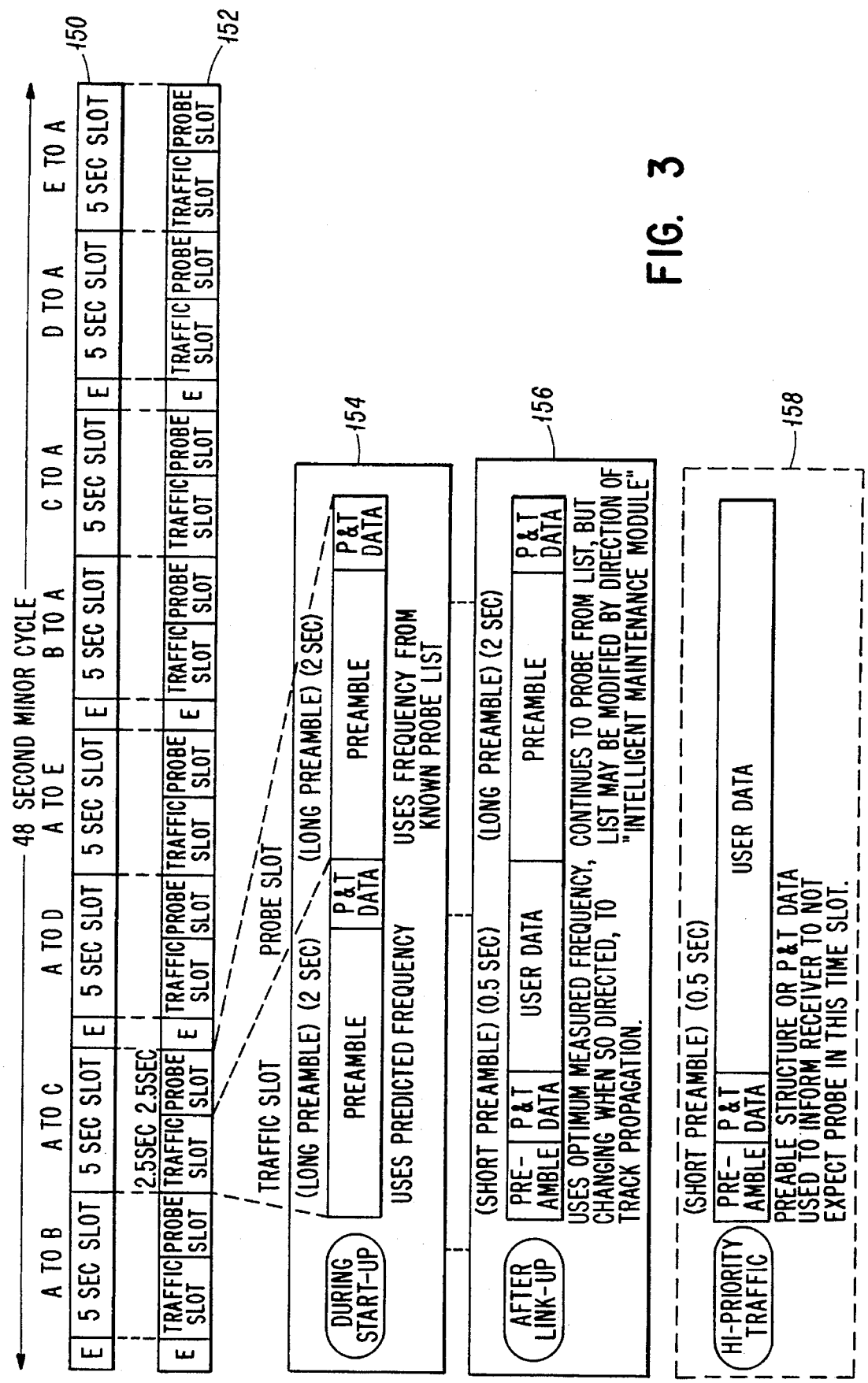
FIG. 3 illustrates the signal types used for maintenance and traffic communication in one embodiment of the present inventive concept.

In FIG. 3 a first waveform or timing representation 150 illustrates a minor cycle previously illustrated in FIG. 2. It indicates that in the first four traffic slots node A, which is the present node, transmits first to node B, then to node C, then to node D, and then to node E. In the last four traffic slots of the minor cycle, the node receives signals from B, C, D, and E (see FIG. 2). As shown previously, there are four emergency time slots interspersed in the traffic time slots. Timing representation 152 provides more definition to the timing representation 150. In other words, it indicates that each of the five second time slots for transmission or reception is divided into a traffic slot, and a probe slot each of 2.5 seconds. A timing representation 154 expands upon timing representation 152 and shows, for a typical five second slot, that during start-up the traffic slot may have a two second or long preamble, and the remaining portion of the two and one-half second time slot contains probe and traffic control data. The probe slot also has a long, two second preamble, and the remaining time comprises probe and traffic data identical to that in the traffic slot. The probe and traffic data in one embodiment of the invention, comprised a frequency index, and order wire index, and acknowledgement sequence number, whether or not the apparatus is in a start-up state, and link quality analysis information. While the traffic slot is shown as using a predicted frequency during start-up, this is an optional part of the algorithm for potentially even faster link-up than the basic concept presented herein.

Until link-up is established, the traffic slot cannot be used to pass traffic data. A way of advantageously using this slot is to use either default frequency, or a predicted frequency and a long preamble to accomplish the functionality of the probe slot. When first starting to probe, the traffic packet of this system must functionally act like a probe packet because the time of arrival is not known. The frequency for transmission may be taken from a default frequency list known at both ends. The way in which the actual value for default frequencies is selected is not an important part of the present inventive concept. However, the defaults are typically selected one time by a designer of the system as the most likely to succeed frequency for the link/path type (in other words, whether the path is long or short). In one embodiment of the invention the default frequency was based on what was likely to work based on experience, propagation predictions and, where possible, From watching the system work over a period of time. An improvement upon the concept is to use multiple default frequencies which are cycled through in a manner similar to the probe frequencies or as in one embodiment of the present concept where there is continually cycling of the traffic frequencies after more than one best traffic frequency is established.

As a further improvement on the concept, the default frequency table may be modified by a prediction program or an algorithm designed to use recent probe results to select the actual frequencies to be used in the traffic slot at the next occurrence of start-up. In this case, the software doing the job of modifying the default list needs to have the same inputs at both nodes to assure that the selected (predicted) frequencies match. Such a modification would provide a natural place to employ a prediction program whose accuracy (for the next 24 hours) can be greatly improved by measuring the channel propagation characteristics, in a manner similar to that done with the probe signals, and updating the model with the measured value (of the highest frequency found to propagate). This would result in the model's input sun spot number being modified to force it to predict the MUF (maximum usable frequency) as measured. Once this pseudo sun spot number has been determined and exchanged at both ends, both affected transceivers will provide a prediction of the same frequency. Further, these frequencies or "answers" are likely to be much more accurate (i.e., more likely to work) when used within the next twenty-four hours.

Timing representation 156 shows the composition of the time slot after link-up with the traffic slot having a short or 28 second preamble, P & T control data, and then user data. The probe time slot remains the same as it did during start-up. As indicated within box 156, the frequencies of the traffic slot use the optimum measured frequencies after link-up, and changes to new frequencies when so directed to track changes in propagation characteristics of the environment. The probe slot, on the other hand, after link-up, continues to probe at frequencies from a predetermined internal list, but in accordance with the over all algorithm of the invention, the list may be modified after link-up by direction of an intelligent maintenance module to be later discussed.

Figure 4:
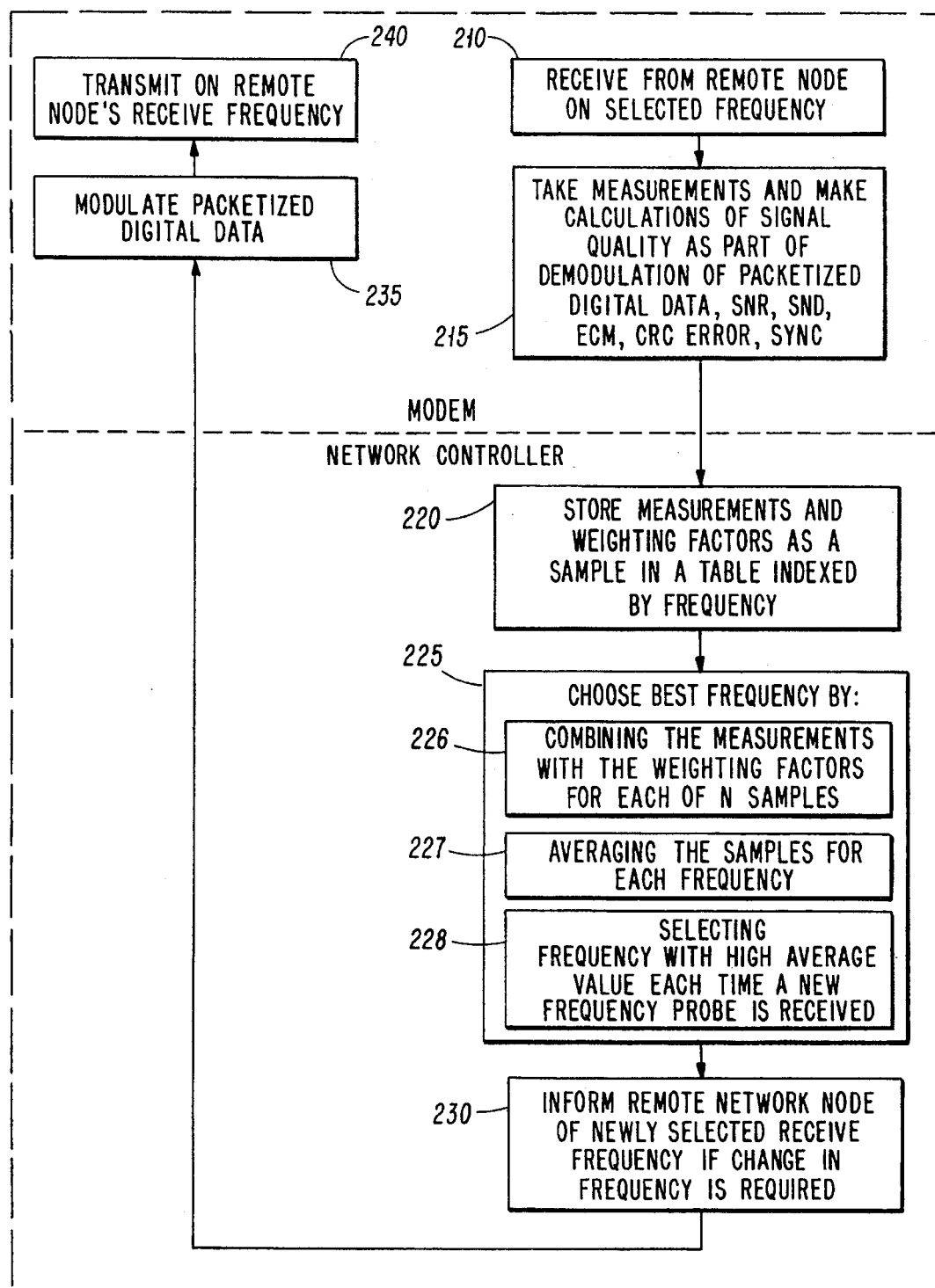
FIG. 4 is an integrated flow diagram of the necessary steps of one embodiment of the teachings of the present invention.

In FIG. 4 a flow diagram is provided reflective of the teachings of the present invention. Block 210 describes the first step of an on-going transmission in which a signal is received from a remote node on a frequency selected in accordance with the teachings of the above referenced U.S. Patents. A plurality of measurements are then made with respect to the received signal as set forth in block 215. In the next step, block 220, the measurements of block 215 are stored. As illustrated in the integrated diagram of FIG. 5, the storing and subsequent logic blocks may be performed in the network controller (see FIG. 1). Alternatively, other suitable means could be provided for accomplishing such functions. In block 225 the best frequency is selected by evaluating the stored parameters of step 220. The remote network node is informed of selected frequency, step 230.

The selection of the best frequency is accomplished in accordance with the sub-routine of steps 226-228. The sample measurements of step 220 are first combined with a predetermined weighting factor, step 226. Next, the samples for each frequency are averaged, step 227. Finally, the frequency with the highest average value is selected.

Similarly shown, blocks 235 and 240 implement the function of block 230. In step 235, data is modulated into packetized digital format. The data of step 235 is then transmitted on remote node's receive frequency, step 240.

Figure 5:
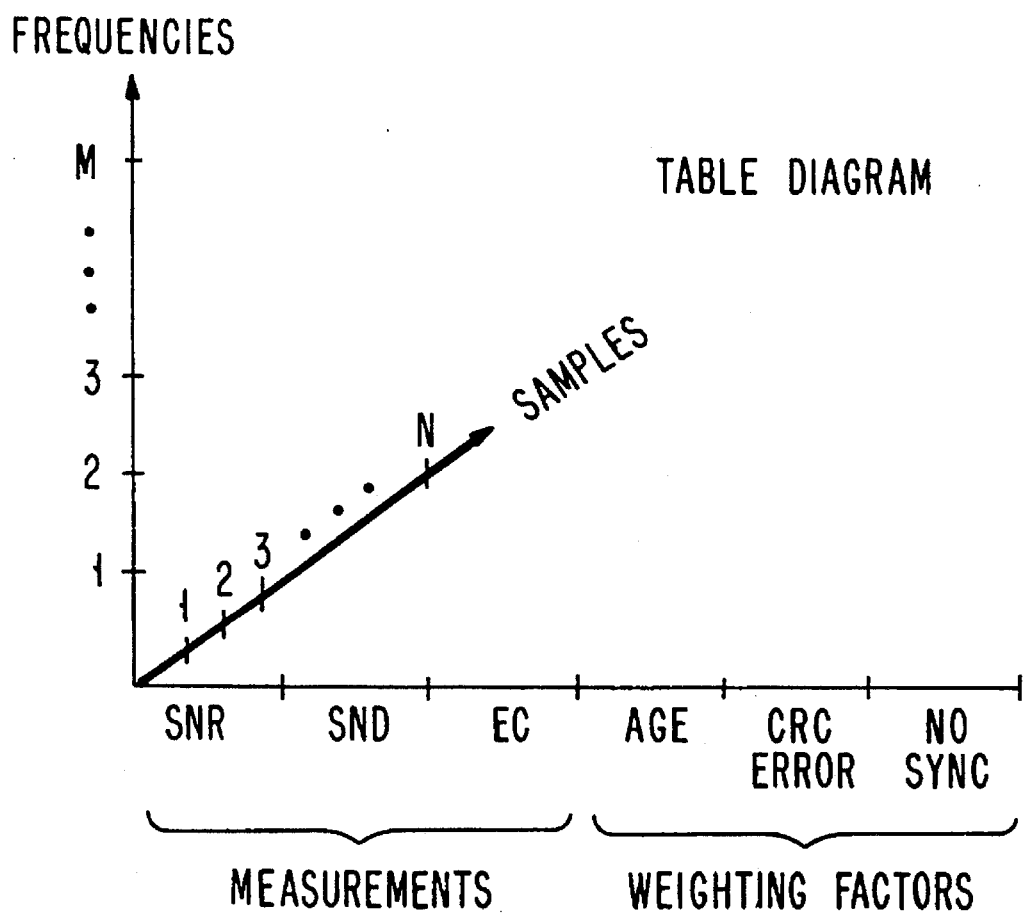
FIG. 5 is a graphical plot of available frequencies, sample-signal parameters and weighting factors.

FIG. 5 illustrates a plotted table diagram of M frequencies comprising the Y-axis and N sample parameter measurements and weighting factors for the X-axis. The graph presents a clearly ordered preference for the desired frequency to be used.

The composite, weighted metric described herein is a combination of three primary measurements and three secondary factors. The first two primary measurements are the average signal-to-noise ratio (SNR) and the average deviation of the signal-to-noise ratio (SND). The SNR and SND result from comparing the energy of the signal with that of the noise on a symbol-by-symbol basis during the reception of a packet and averaging the results over the length of the packet. Because SND represents a negative factor it is then subtracted from SNR to yield a metric that not only reflects the quality of the signal, but also takes into account the variation in signal strength, which can lead to symbol errors, and in a frequency hopping system is an indication of coherency or interference over the hop bandwidth.

The third primary measurement is based on the so-called Viterbi Shortest-path Metric (VSM) and is derived from an array of survivor metrics generated during the Viterbi decoding process. It is an indirect measure of the number of bit errors that were corrected while decoding the packet. It is calculated by dividing the highest value in the array with the average of all the other values in the array. This number is then multiplied with the FEC rate (½ rate encoding would result in a divide by 2) to normalize to the code rate. This yields a confidence factor representing the probability that the path taken through the Viterbi trellis was indeed the correct one. A high VSM indicates that the path with the highest metric was significantly better than all other paths, while a lower VSM indicates that there was less difference between the path with the highest metric and all the other paths, making it more likely that the incorrect path was chosen, which would result in uncorrected bit errors and would be detected by the CRC.

VSM is utilized because it provides a more direct measurement of link quality (bit error rate) than does SNR or SND. However, it is meaningful only when there is a significant amount of encoded user data within the packet. However, the length of a probe packet may be dominated by the synchronization preamble, in which case the SNR and SND values may be more significant than VSM because they do not distinguish between the preamble and encoded data. By combining all three (SNR, SND, VSM) of these measurements the same way for both probe and data packets, the differences between the packets become less significant and a higher overall confidence in the composite metric is achieved as compared with that of any individual metric. Specifically, the VSM value is scaled to match the range of SNR less SND and then averaged together.

The composite VSM/SNR/SND metric of one sample is then weighted by the other three secondary factors and averaged with the other samples in the database to yield the final composite metric. The first factor is the age of the signal. Newer samples are given a higher weight. The second factor is whether or not synchronization was achieved when a packet reception was expected. If synchronization was not achieved then the average value is penalized. The last factor is whether or not a CRC error occurred in a given packet. If an error is detected, the average is penalized by half as much as if synchronization had not occurred. This composite, the weighted average metric, is then used to determine the relative quality of one frequency with respect to another and is used as the basis for maintaining the best possible traffic frequencies between the two nodes taking the measurement.

Those skilled in the art will readily recognize that various modifications and changes may be made to the present invention without departing from the true spirit and scope thereof, which is set forth in the following claims.

We claim:

1. A method of determining an optimum frequency or pair of frequencies for use in skywave communication apparatus, from a set of M frequencies comprising the steps of:

measuring incoming symbol signals, wherein at least some sets of symbol signals are changing in frequency on a periodic basis, for signal quality in the form of average signal-to-noise ratio value, signal-to-noise deviation value, and error correction metric value;

storing the measured values for each of M frequencies;

maintaining the stored values for N sample times;

combining the stored values for each of the M, frequencies in accordance with a given weighting algorithm to obtain N times M product values;

averaging the N product values for each of the M frequencies to obtain M average product values;

selecting the optimum frequency as the frequency having the largest product value with the largest value, wherein the combining in accordance with the given weight algorithm comprises the steps of:

adding the error correction metric and average signal-to-noise ratio value and subtracting therefrom the signal-to-noise deviation value to obtain a positive number subtracted value; and lowering the positive number subtracted value, incrementally as a function of age of the sample time, the occurrence of data bit error indications and the lack of indication of synchronization.

* * * * *